I. D. THORNBURGH.
SYRUPING APPARATUS.
APPLICATION FILED JAN. 4, 1916.

1,284,948.

Patented Nov. 12, 1918.
4 SHEETS—SHEET 2.

WITNESS

INVENTOR.

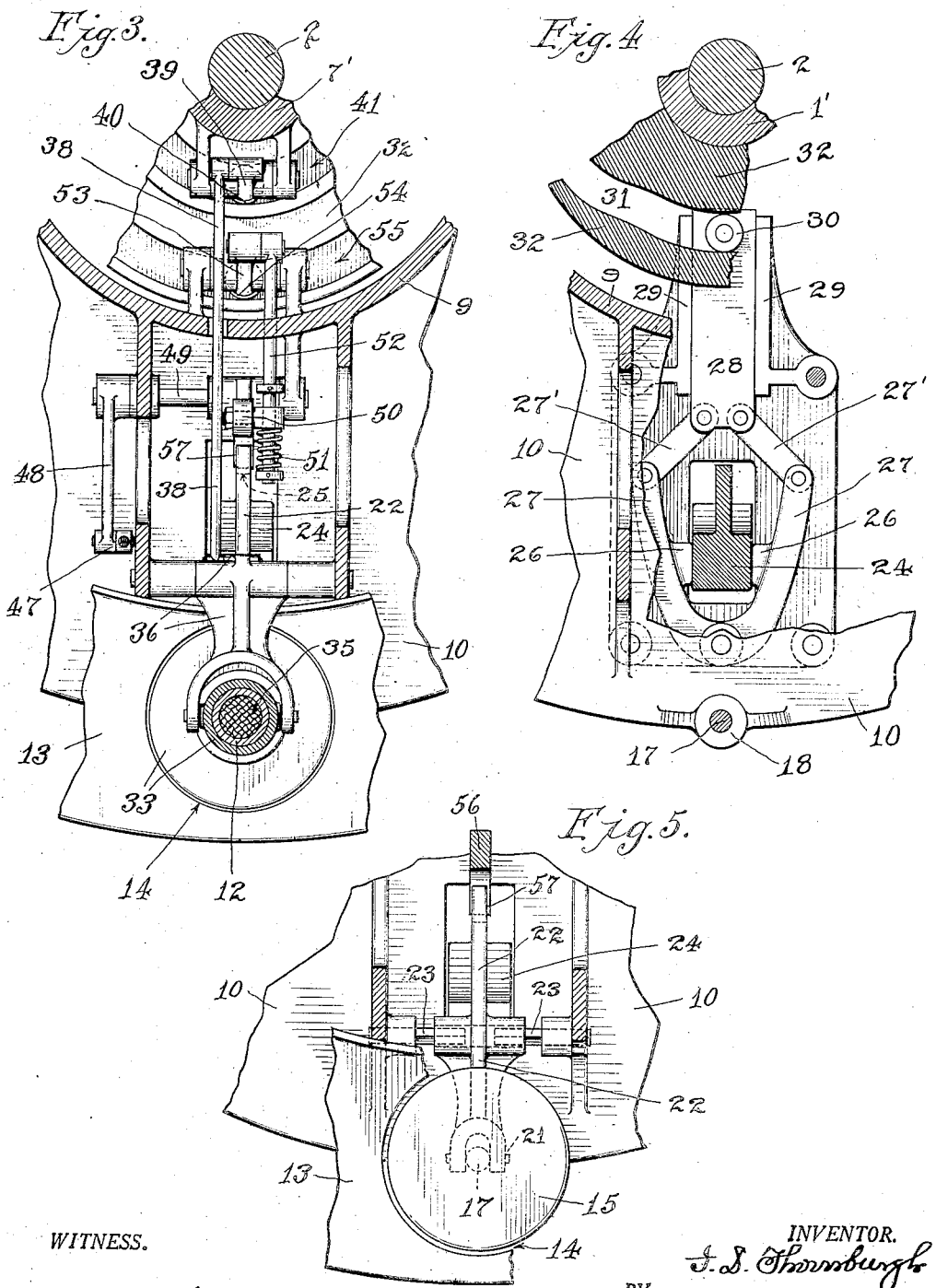

I. D. THORNBURGH.
SYRUPING APPARATUS.
APPLICATION FILED JAN. 4, 1916
1,284,948.
Patented Nov. 12, 1918.
4 SHEETS—SHEET 4.
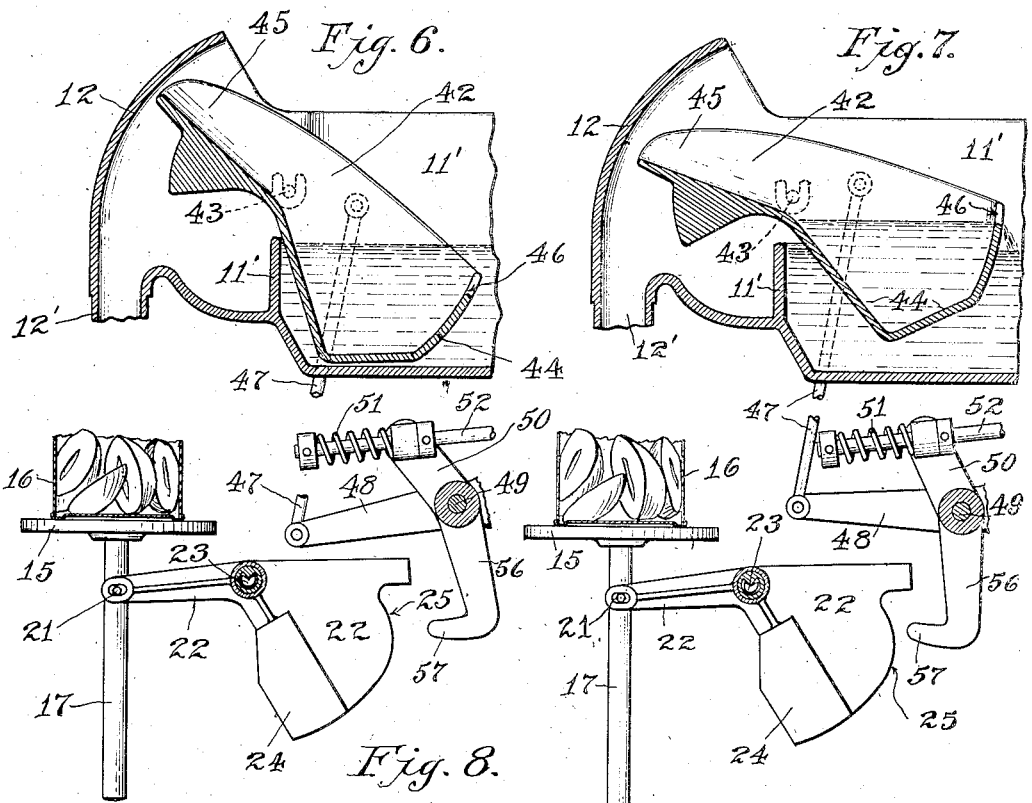
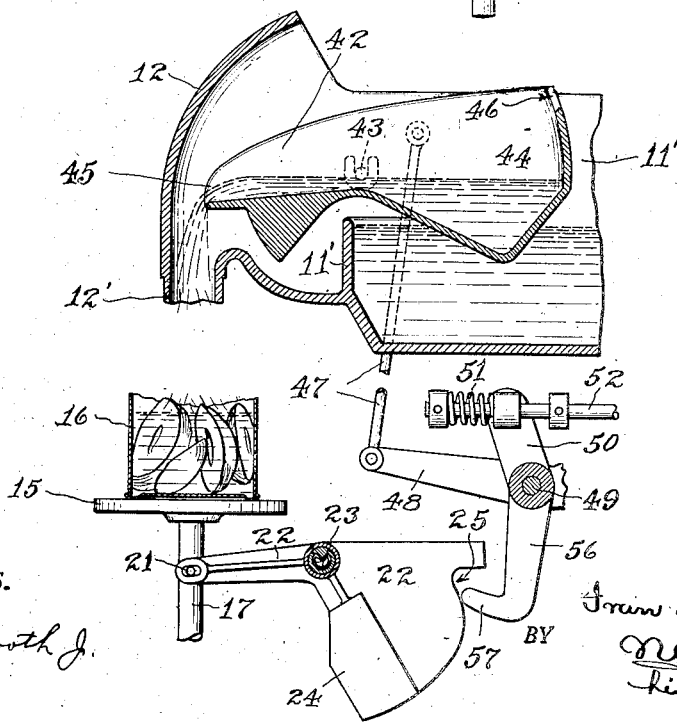
WITNESS.
W. F. Booth Jr.
INVENTOR.
Irwin D. Thornburgh
BY
ATTORNEY.

UNITED STATES PATENT OFFICE.

IVAN D. THORNBURGH, OF OAKLAND, CALIFORNIA, ASSIGNOR TO AMERICAN CAN COMPANY, OF SAN FRANCISCO, CALIFORNIA, A CORPORATION OF NEW JERSEY.

SYRUPING APPARATUS.

1,284,948.  Specification of Letters Patent.  Patented Nov. 12, 1918.

Application filed January 4, 1916. Serial No. 70,313.

*To all whom it may concern:*

Be it known that I, IVAN D. THORNBURGH, a citizen of the United States residing at Oakland, in the county of Alameda and State of California, have invented certain new and useful Improvements in Syruping Apparatus, of which the following is a specification.

The present invention relates to a machine for filling containers having solids therein with liquid to a predetermined weight, and is particularly adapted for filling cans or other containers used for the preservation of food products or the like, especially fruit, with a liquid, as, for example, syrup.

In filling such containers, the solid material, as, for example, fruit, is put in before the syrup or other liquid is permitted to enter thereinto. The net weight of the container with its solids and liquid or syrup contents must not be less than a certain amount, and it is therefore required that the quantity of syrup or liquid supplied to the container with the solids therein shall be such as will insure the container weighing a given weight when discharged from the syruping apparatus, so that each and every filled container will be of a given net weight, thereby giving uniformity as to weight of the discharged filled containers, and by so doing complying with the law relative to the packing of food products.

In syruping machines at present known and used, either the same definite measured quantity of liquid is put into each container, or else the container is first filled to overflowing, and then some of the liquid removed therefrom, to establish a uniform volume in each container, irrespective of the weight of solid content, or the total net weight of both solid and liquid. The latter process is particularly objectionable, on account of the unavoidable slopping and spilling of liquid, which results in increased cost of handling the containers, and a considerable waste of liquid.

The object of the present invention, therefore, is to provide a machine for automatically filling containers with a quantity of liquid, said quantity depending upon the weight of solid material previously put into the container to secure uniformity of weight for the filled containers, and which performs its function without spilling or wasting any of said liquid.

The invention is not limited to a machine for syruping fruit-containing cans, but since it is particularly well adapted for such use, it will be so described and illustrated hereinafter.

In order to comprehend the invention, reference should be had to the accompanying sheets of drawings, in which—

Fig. 3 is a detailed plan view, partially in section, taken on line *s—s* in Fig. 2 of the drawings, and viewed in the direction of the arrows.

Fig. 4 is a detailed plan view, partially in section, taken on line *w—w*, in Fig. 2, of the drawings, and viewed in the direction of the arrows.

Fig. 5 is a detailed plan view, partially in section, taken on line *u—u* in Fig. 2 of the drawings, and viewed in the direction of the arrows.

Fig. 6 is a vertical sectional detail, taken in the direction of the arrows, on line *y—y* in Fig. 1 of the drawings, certain parts being broken away, showing the associated parts at the beginning of a filling operation.

Fig. 7 is a view similar to Fig. 6 showing the relative positions of the parts at an intermediate point in the filling operation.

Fig. 8 is a view similar to Fig. 6, showing the relative positions of the parts at the end of the filling operation.

Figure 2:
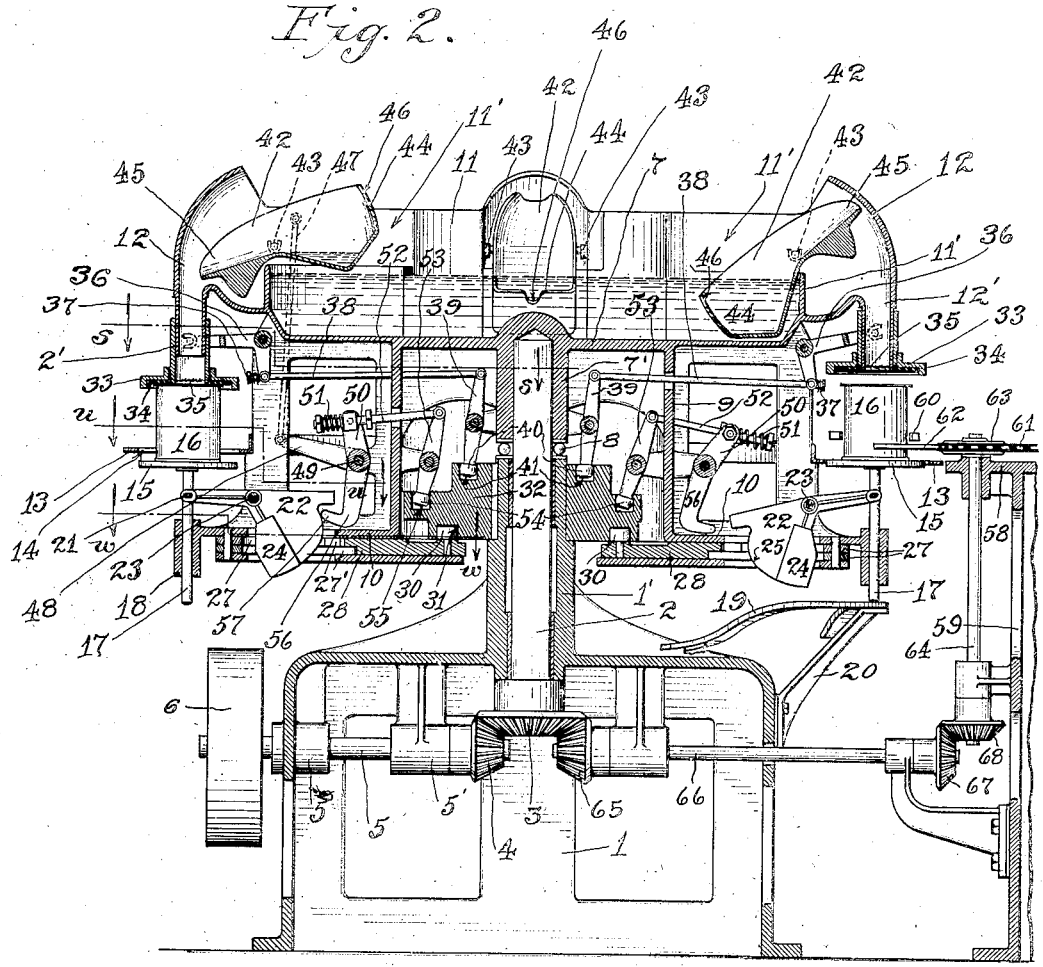
Fig. 2 is a central vertical section taken on line *x—x* in Fig. 1 of the drawings, and viewed in the direction of the arrows.

In the drawings, and referring particularly to Fig. 2 thereof, the numeral 1 represents a suitably formed base, in an upwardly extended portion 1' of which is rotatably mounted a central vertical shaft 2, provided at its lower end with a bevel gear 3 adapted to mesh with a co-acting gear 4 carried by a horizontal drive shaft 5, said drive shaft being suitably journaled at 5' in said base 1, and carrying means, as, for example, a belt pulley 6, for receiving power from an outside source, not shown in the drawings.

Carried by and fixed to the upper end of the vertical drive shaft 2 is a horizontally rotatable turret 7. A thrust bearing 8 is interposed between the hub 7' of said turret 7 and the upper portion 1' of the base 1, to carry the weight of said turret. The turret 7 comprises a cylindrical depending portion 9 which serves to unite together a lower horizontal plate 10 and an upper liquid containing pan 11, the latter having a series of radially disposed pockets 11', each terminating in a downwardly extending spout 12. Said pockets are illustrated in the drawings as four in number, although any number consistent with structural practicability may be used. Each spout 12 has associated therewith the hereinafter described mechanism, which forms a complete unit for the filling of one can, and since all of these units are identical in construction and operation, a description of one will suffice for all.

A horizontal annular shelf or plate 13, Figs. 1 to 5 of the drawings, surrounds the turret 7 and is carried thereby, below the level of the liquid-containing pan 11. An opening 14 is formed in said shelf 13 under each spout 12, and arranged for vertical movement within said opening is a weighing platform 15 adapted to receive a can 16 in which has previously been placed the solid portion of its contents. Said platform 15 is supported by a vertically disposed rod 17, slidably mounted in a bracket 18 carried by the lower plate member 10 of the turret 7. The lower end of said rod 17 projects below said plate member 10 of the turret 7, and at certain portions of the cycle of operation of the machine rides upon a stationary cam track 19, Figs. 1 and 2 of the drawings, supported by a bracket 20 extended from the base 1, so that the platform 15 is held in a position flush with the annular shelf 13.

Attached by a sliding pivotal connection 21 to the rod 17 supporting the weighing platform 15, is a balance beam 22, Figs. 2 to 8 of the drawings, fulcrumed upon knife edges 23, and carrying upon its inner end a counter-weight 24 and a cam surface 25. The object of the counter-weight 24 is to balance and support the weight of the weighing platform 15 with the can 16 thereon, when the rod 17 is not riding upon the stationary track 19. A pair of clamp-jaws 26, Fig. 4 of the drawings, operated by a system of toggle levers 27 and 27' carried by the lower plate 10 of the turret 7, are disposed upon either side of the weight 24 and adapted to be closed upon the same to prevent any movement of the weighing platform 15, and said counter-weight 24, after the same have reached a condition of equilibrium. The toggles 27 and 27' are operated, to open and close the clamp-jaws 26, by a sliding member 28 working in suitably formed guide-ways 29 in the plate 10, and carrying on its inner end a cam-following roller 30, Figs. 2 and 4 of the drawings, adapted to follow an irregular groove 31 in the under side of a stationary cam-member 32 carried by and fixed to the upward central extension 1' of the base 1.

Upon the tubular downwardly extending end 12' of each spout 12 is slidably mounted a cap 33, Figs. 2 and 3 of the drawings, provided on its lower surface with a gasket 34 adapted to make a comparatively tight seal between said cap and the flange of the can 16. A wire gauze or screen 35 is also provided across the central orifice in said cap 33, to press down any of the solid material within the can 16 which may be projecting above the rim thereof. The cap 33 is raised and lowered by a bell-crank 36 connected, through a flexible spring joint 37, by a rod 38, to a lever 39 which carries on its opposite end a cam-following roller 40 adapted to follow an irregular groove 41 in the upper surface of the stationary cam member 32.

In each radial extension 11' of the liquid-containing pan 11 is mounted a tilting bucket 42, Figs. 1, 2, 6, 7 and 8 of the drawings, fulcrumed at 43, and formed as illustrated with an enlarged ladle portion 44 and a weighted spout portion 45. A spillway 46 is provided in the end wall of the ladle portion 44 to insure the lifting of a uniform quantity of liquid irrespective of the level thereof in the pan 11, as shown in Fig. 7 of the drawings. The bucket 42 is tilted by means of a rod 47 connected by a lever 48 to a rock-shaft 49, Figs. 2, 3 and 6 to 8 of the drawings, which carries a lever 50 flexibly connected by a spring 51 and a rod 52 to a lever 53 which carries on its lower end a cam-following roller 54 adapted to follow a third irregular groove 55 in the stationary cam member 32. The rock-shaft 49 also carries a downwardly extending arm 56 provided with a finger 57 adapted to abut against the cam surface 25 of the balance beam 22 to limit the motion of said rockshaft, and consequently the tilting of the bucket 42, to regulate the amount of liquid poured therefrom.

Figure 1:
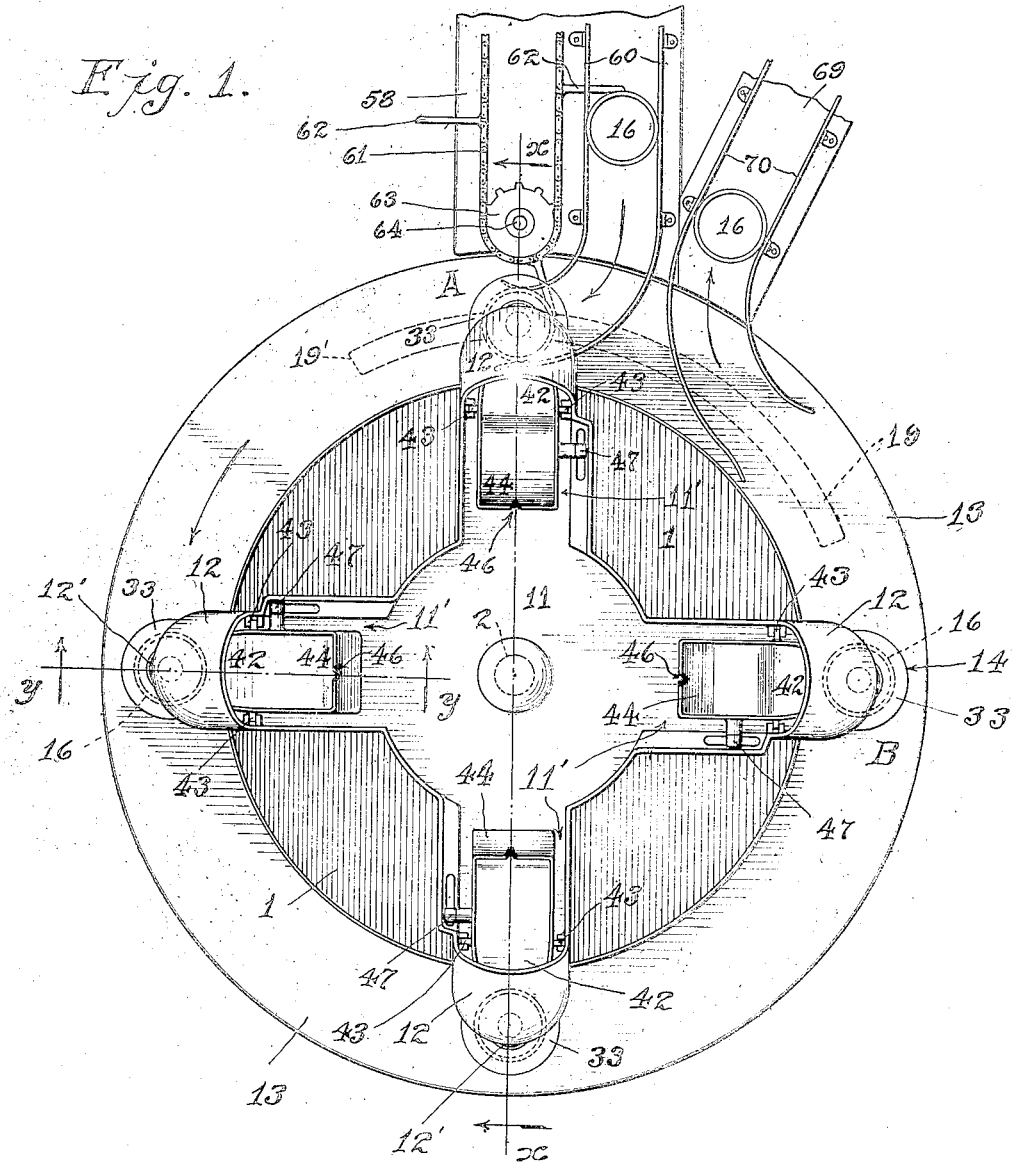
Figure 1 is a plan view of the syruping machine.

Cans are brought into the sphere of action of the machine by any suitable means, as, for example, a conveyer track 58, Figs. 1 and 2 of the drawings, supported by a frame 59, at the level of the annular shelf 13 on the turret 7. Guide rails 60 are provided, and a conveyer chain 61 having can engaging fingers or flights 62 is carried by a sprocket 63 mounted upon a vertical shaft 64, Fig. 2 of the drawings, said shaft being driven from the vertical turret shaft gear 3 by means of a bevel gear 65, a horizontal shaft 66, and a pair of bevel gears 67 and 68. A similar conveyer track 69, with guide rails 70, is provided for guiding the syruped and weighed cans away from the machine.

In the operation of the machine, a can, in which has previously been placed the solid part of its contents, is placed on one of the continuously moving weighing platforms 15, at the position A, Fig. 1 of the drawings, by the conveyer means above described. At this point the rod 17 is riding upon the stationary track 19, and supporting the weighing platform 15 level with the annular shelf 13 of the turret 7.

When the rod 17, by the continuous rotation of the turret 7, is carried off the end 19' of the track 19, the platform 15, with the superposed can 16, drops down, and the counter-weight 24 is raised until a condition of equilibrium is reached.

Further rotation of the turret 7 now causes the cam roller 30 to follow the irregular cam groove 31 to close the clamp-jaws 26 tightly upon the weight 24, thus locking the platform 15, with the can 16 thereon, in the vertical position in which it has come to rest, as shown in Fig. 4 of the drawings. Immediately thereafter the cam roller 40 and the groove 41 coact to bring the cap 33, through the described system of levers and rods, firmly down upon the upper open end of the can 16. The cam roller 54, following the groove 55, now acts, through the means described to tilt the bucket 42 from the position shown in Fig. 6 of the drawings, until the finger 57 of the arm 56 abuts against the cam surface 25 of the balance beam 22, as shown in Figs. 2 and 8 of the drawings, thus allowing a certain quantity of the liquid contained in said bucket 42 to flow out and down through the spout 12 and the neck 12' into the can 16.

It will be seen that the less is the weight of the solid material in the can 16, when said can is placed upon the platform 15, the less will the weight 24 be raised; and on account of the shape of the cam surface 25, the less said weight 24 is raised, the more the bucket 42 will be tilted, and consequently the more liquid will be poured therefrom. Therefore, the less solid material in the can, the more liquid will be poured thereinto, and vice versa.

After the pouring operation is completed, as, for example, at the position B in Fig. 1 of the drawings, the jaws 26 are opened to free the weight 24, the rod 17 rides up onto the cam track 19, thus raising the platform 15 to the level of the annular shelf 13, and the can 16 is removed from said platform onto the track 69 by the guide rails 70, and taken away from the machine by any suitable means, not shown in the drawings, and forming no part of the present invention.

The invention has been described and illustrated herein as relating to a syruping machine for fruit cans, for the reason that it is peculiarly applicable to this purpose. It is obvious, however, that the spirit of the invention is not limited to such machines, but includes broadly a machine for supplying fluent material of any character to a container of variable weight, for the purpose of securing a predetermined final weight therefor, and it is therefore my wish to claim the invention as broadly as the art will permit.

Having thus described my invention, what I claim as new and desire to protect by Letters Patent is:—

1. In an apparatus for the described purpose the combination of a material-delivering device having a variable distance of movement, its greater distance of movement operating to deliver a greater amount of material, a weighing means, and connections between said weighing means and said delivering device whereby a greater movement of said weighing means imparts a less movement to said delivering device.

2. In an apparatus for the described purpose the combination of a material-delivering device having a variable distance of movement, its greater distance of movement operating to deliver a greater amount of material, a weighing means, connections between said weighing means and said delivering device whereby a greater movement of said weighing means imparts a less movement to said delivering device, and means for uniting and releasing said connections.

3. In an apparatus for the described purpose the combination of weighing means adapted to receive a receptacle to be filled, a movable bucket for containing the filling material, and connections between said weighing means and bucket whereby they are caused to move together, said bucket having a variable movement and adapted to deliver more or less material according to the distance of movement of the weighing means and bucket.

4. In an apparatus for the described purpose the combination of a tiltable bucket adapted to deliver more or less material according to the degree to which it is tilted, weighing means, and connections between the weighing means and bucket whereby a greater movement of the weighing means imparts to the bucket a less material-delivering movement.

5. In an apparatus for the described purpose, a weighing platform for receiving a container with contents of a variable weight therein, and adapted to be depressed thereby; a counter-weight associated with said platform for balancing the same in a position corresponding to the weight of said contents; means for securely holding said platform in said balanced position, and devices controlled by said position for introducing a variable amount of fluent material into said container to secure a predetermined final weight therefor.

6. In an apparatus for the described purpose, movable means for receiving and supporting a container, and adapted to be depressed by the weight thereof; a tilting bucket adapted to pour a variable quantity of fluent material into said container; associated devices controlled by the position of said receiving and supporting means for regulating the quantity of fluent material poured into said container; and means for tilting said bucket to supply said fluent material thereto and discharge it therefrom.

7. In an apparatus for the described purpose, a vertically movable platform adapted to receive and support a container, and to be depressed by the weight thereof; a tilting bucket adapted to pour a variable quantity of fluent material into said container; associated devices controlled by the position of said platform for regulating the quantity of fluent material poured into said container; and means for tilting said bucket to supply said material thereto and discharge it therefrom.

8. In an apparatus for the described purpose, a vertically movable platform adapted to receive and support a container, and to be depressed by the weight thereof; a tilting bucket adapted to pour a variable quantity of fluent material into said container; associated devices controlled by the position of said platform for limiting the distance through which said bucket is tilted to regulate the quantity of fluent material poured therefrom into said container; and means for tilting said bucket to supply said material thereto and discharge it therefrom.

9. In an apparatus for the described purpose, a vertically movable platform adapted to receive and support a container of variable weight, and to be depressed thereby a variable distance depending upon said weight; a tilting bucket adapted to pour a variable quantity of fluent material into said container; associated devices controlled by the position of said platform for limiting the distance through which said bucket is tilted to regulate the quantity of fluent material poured therefrom into said container; and means for tilting said bucket for supplying said material thereto and discharging it therefrom.

10. In an apparatus for the described purpose, a movable platform for receiving a container, and adapted to be depressed by the weight thereof; a counterweight associated with said platform for balancing the same in a position depending upon the weight of said container; a tilting bucket adapted to pour a variable quantity of fluent material into said container; associated devices controlled by the position of said platform for regulating the quantity of fluent material poured into said container; and means for tilting said bucket to supply said material thereto and discharge it therefrom.

11. In an apparatus for the described purpose, a movable platform for receiving a container, and adapted to be depressed by the weight thereof; a counterweight associated with said platform for balancing the same in a position depending upon the weight of said container; means for securely holding said platform in said balanced position; a tilting bucket adapted to pour a variable quantity of fluent material into said container; associated devices controlled by the position of said platform for regulating the quantity of fluent material poured into said container; and means for tilting said bucket to supply said material thereto and discharge it therefrom.

12. In an apparatus for the described purpose, a movable platform for receiving a container, and adapted to be depressed by the weight thereof; a counterweight associated with said platform for balancing the same in a position depending upon the weight of said container; clamping means acting upon said counterweight to hold said platform in said balanced position; a tilting bucket adapted to pour a variable quantity of fluent material into said container; associated devices controlled by the position of said platform for regulating the quantity of fluent material poured into said container; and means for tilting said bucket to supply said material thereto and discharge it therefrom.

13. In an apparatus for the described purpose, a rotating turret carrying means for receiving a container with contents of a variable weight therein, and devices controlled by the weight of said container and contents, and actuated by the rotation of said turret, for introducing a variable amount of fluent material into said container, to secure a predetermined final weight therefor; and means for rotating said turret.

14. In an apparatus for the described purpose, a rotating turret carrying a weighing platform for receiving a container with contents of a variable weight therein and adapted to be depressed thereby, a counterweight associated with said platform for balancing the same in a position depending upon the weight of said contents, and devices controlled by the balanced position of said platform and actuated by the rotation of said turret for introducing a variable amount of fluent material into said container to secure a predetermined final weight therefor; and means for rotating said turret.

15. In an apparatus for the described purpose, a rotating turret carrying a weighing platform for receiving a container with contents of a variable weight therein and adapted to be depressed thereby, a counterweight associated with said platform for balancing the same in a position depending upon the weight of said contents, means actuated by the rotation of said turret for securely holding said platform in said balanced position, and devices controlled by the balanced position of said platform and actuated by the rotation of said turret for introducing a variable amount of fluent material into said container to secure a predetermined final weight therefor; and means for rotating said turret.

16. In an apparatus for the described purpose, the combination with weighing means for receiving and supporting a container and adapted to be depressed by the weight thereof, of a reservoir adapted to contain a supply of fluent material, and tilting means within said reservoir for supplying a variable amount of said fluent material to said container, to secure a predetermined final weight for the contents thereof.

17. In an apparatus for the described purpose, the combination with means for receiving a container with contents of a variable weight therein, of a reservoir adapted to contain a supply of fluent material, and tilting means within said reservoir, controlled by the weight of said container and contents, for supplying a variable amount of said fluent material to said container, to secure a predetermined final weight therefor.

18. In an apparatus for the described purpose, the combination with movable means for receiving and supporting a container, and adapted to be depressed by the weight thereof, of a reservoir adapted to contain a supply of fluent material, and tilting means within said reservoir for supplying a variable quantity of said fluent material to said container, and associated devices controlled by the position of said receiving and supporting means for regulating the quantity of said material supplied to said container, and means for actuating said tilting means to supply said material thereto and discharge it therefrom.

19. In an apparatus for the described purpose, a rotating turret carrying weighing means for receiving and supporting a container, a reservoir adapted to contain a supply of fluent material, and tilting means within said reservoir for supplying a variable amount of said fluent material to said container to secure a predetermined final weight for the contents thereof; and means for rotating said turret.

20. In an apparatus for the described purpose, a rotating turret carrying weighing means for receiving and supporting a container, a reservoir adapted to contain a supply of fluent material, and a tilting bucket within said reservoir for supplying a variable amount of said fluent material to said container to secure a predetermined final weight for the contents thereof; and means for rotating said turret to actuate said tilting bucket.

21. In an apparatus for the described purpose, a rotating turret carrying a vertically movable platform adapted to receive a container and to be depressed by the weight thereof, a reservoir adapted to contain fluent material, a tilting bucket within said reservoir, actuated by the rotation of said turret and controlled by the position of said receiving platform, for introducing a variable quantity of said fluent material into said container to secure a predetermined final weight for the contents thereof; and means for rotating said turret.

22. In an apparatus for the described purpose, a rotating turret carrying a vertically movable platform adapted to receive a container and to be depressed by the weight thereof, a counterweight associated with said platform for balancing the same in a depressed position, a reservoir adapted to contain fluent material, a tilting bucket within said reservoir, actuated by the rotation of said turret and controlled by the position of said receiving platform, for introducing a variable quantity of said fluent material into said container to secure a predetermined final weight for the contents thereof; and means for rotating said turret.

23. In an apparatus for the described purpose, a rotating turret carrying a vertically movable platform adapted to receive a container and to be depressed by the weight thereof, a counterweight associated with said platform for balancing the same in a depressed position, clamping devices actuated by the rotation of said turret for holding said platform and said counterweight in said depressed position, a reservoir adapted to contain fluent material, a tilting bucket within said reservoir, actuated by the rotation of said turret and controlled by the position of said receiving platform, for introducing a variable quantity of said fluent material into said container to secure a predetermined final weight for the contents thereof; and means for rotating said turret.

24. In an apparatus for the described purpose, a rotating turret carrying balanced weighing means adapted to receive a container and to be actuated by the weight thereof, clamping devices for holding said weighing means in balanced position, a reservoir adapted to contain fluent material, a movable spout associated therewith for making fluid connection between said container and said reservoir, a tilting bucket within said reservoir for transferring a variable quantity of said fluent material from said reservoir into said container, and devices associated with said weighing means for controlling the amount of fluent material so transferred; and means for rotating said turret to actuate said clamping devices, said spout, and said bucket.

25. In an apparatus for the described purpose, a rotating turret carrying balanced weighing means adapted to receive a container and to be actuated by the weight thereof, clamping devices for holding said weighing means in balanced position, a reservoir adapted to contain fluent material, a movable spout associated therewith for making fluid connection between said container and said reservoir, a tilting bucket within said reservoir for transferring a variable quantity of said fluent material from said reservoir into said container, and devices associated with said weighing means for controlling the amount of fluent material so transferred; means for rotating said turret to actuate said clamping devices, said spout, and said bucket; and conveying means for supplying containers to said weighing means and removing the same therefrom.

26. In an apparatus for the described purpose, a rotating turret carrying a plurality of balanced weighing devices adapted to receive containers and to be actuated by the weight thereof, clamping devices for holding said weighing devices in balanced position, a reservoir adapted to contain fluent material, a plurality of movable spouts associated therewith for making fluid connections between said containers and said reservoir, a tilting bucket associated with each spout, within said reservoir, for transferring a variable quantity of said fluent material from said reservoir into the container in registry with said spout, and devices associated with the weighing devices for controlling the amount of fluent material so transferred; means for rotating said turret to actuate said clamping devices, said spouts, and said buckets; and conveying means for successively supplying containers to said weighing means and removing the same therefrom.

27. In an apparatus for the described purpose, a continuously rotating turret carrying a plurality of peripherally disposed balanced weighing devices adapted to receive containers and to be actuated by the weight thereof, clamping devices for holding said weighing devices in balanced position, a centrally disposed reservoir adapted to contain fluent material, a plurality of radially disposed movable spouts associated therewith for making fluid connections between said containers and said reservoir, a tilting bucket associated with each spout, within said reservoir, for transferring a variable quantity of said fluent material from said reservoir into the container in registry with said spout, and devices associated with the weighing devices for controlling the amount of fluent material so transferred; means for rotating said turret to actuate said clamping devices, said spouts, and said buckets; and conveying means for successively supplying containers to said weighing means and removing the same therefrom.

28. In a syruping apparatus for packing containers, a support for successively receiving containers having contents of varying weights therein, said support being differently movable according to said weights, and syrup-supplying means variably controlled by the movement of said support for automatically supplying syrup to the container according to the requirement of each to bring all of the same to substantially the same standard of total weight.

In testimony whereof I have signed my name to this specification in the presence of two subscribing witnesses.

IVAN D. THORNBURGH.

Witnesses:
H. F. BOOTH, Jr.,
D. D. RICHARDS.